Sept. 9, 1930.    R. BACCELLIERI ET AL    1,775,505
NOODLE CUTTING MACHINE
Filed Feb. 15, 1930    4 Sheets-Sheet 3
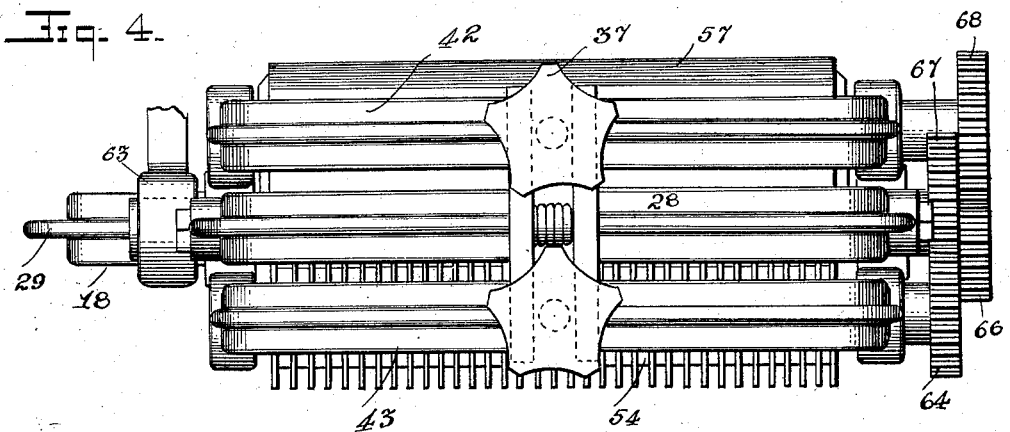
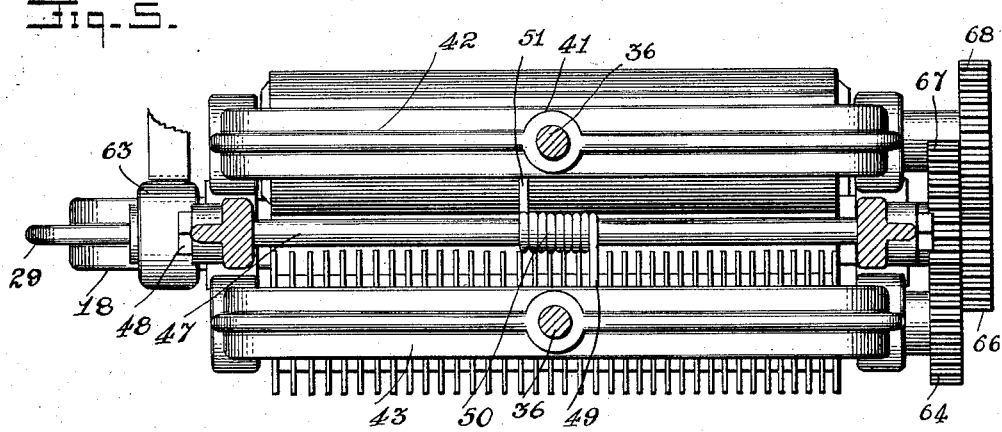
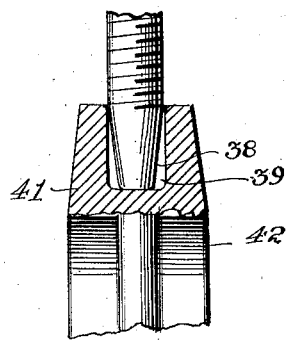

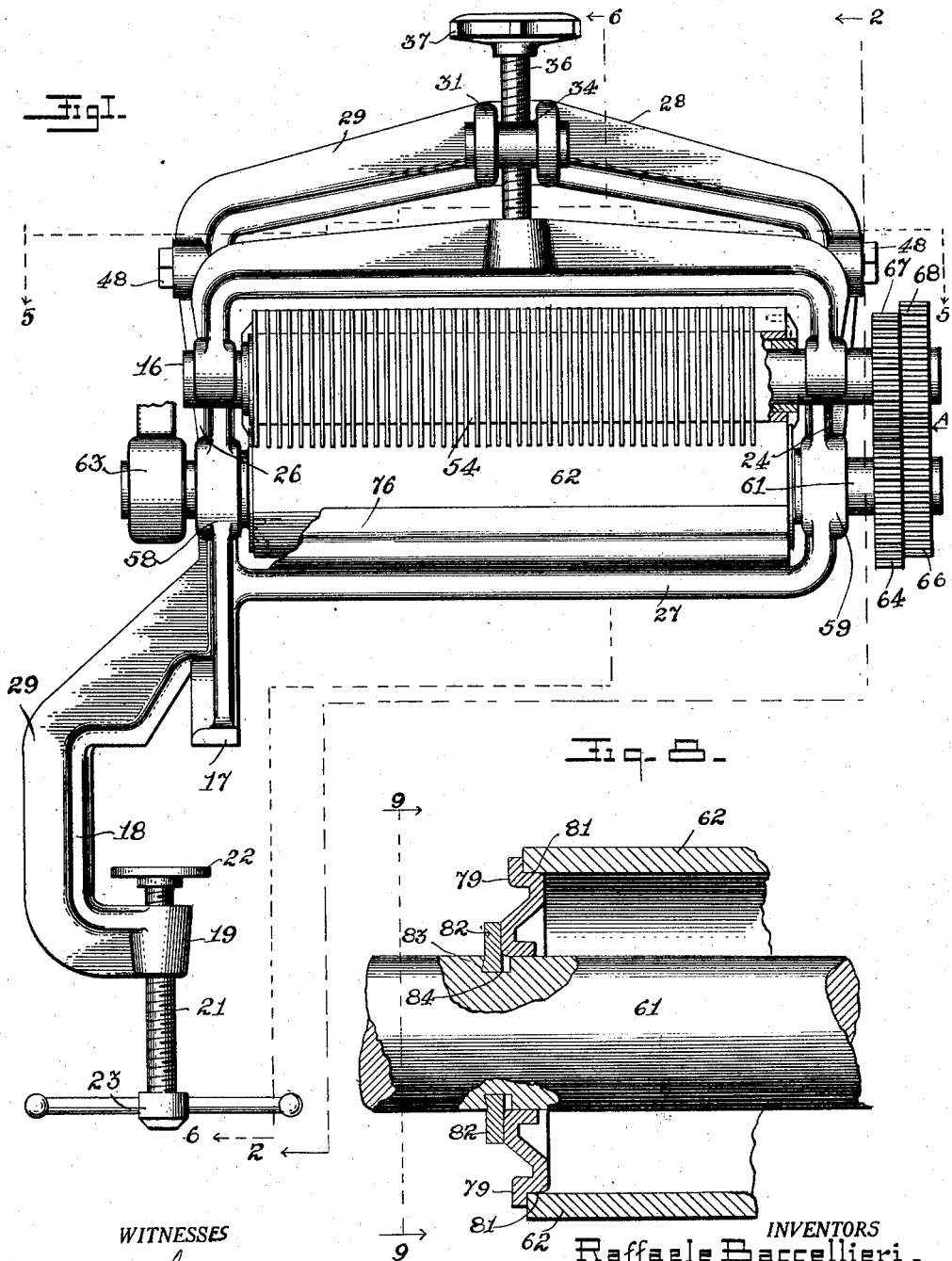

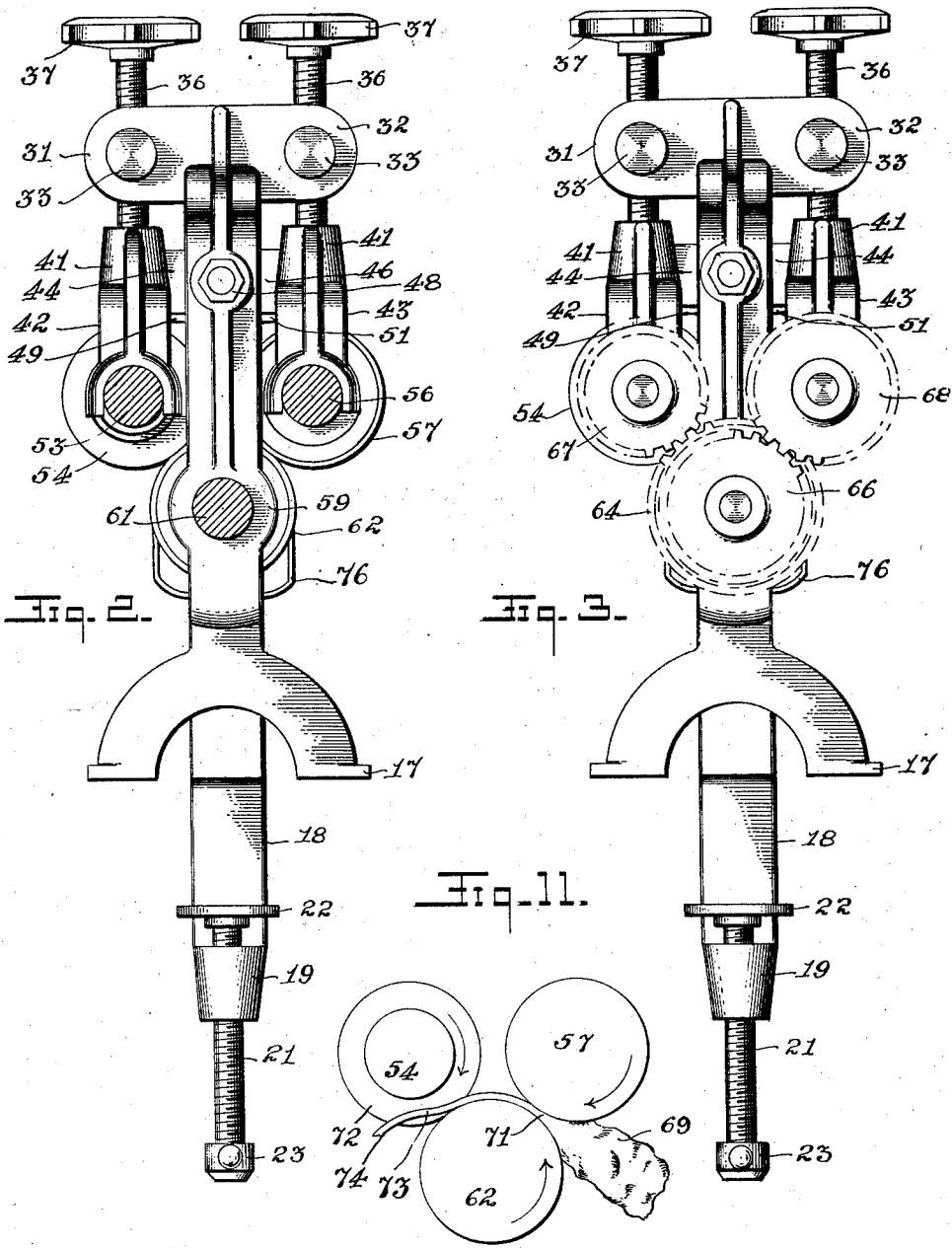

Sept. 9, 1930. R. BACCELLIERI ET AL 1,775,505
NOODLE CUTTING MACHINE
Filed Feb. 15, 1930 4 Sheets-Sheet 4
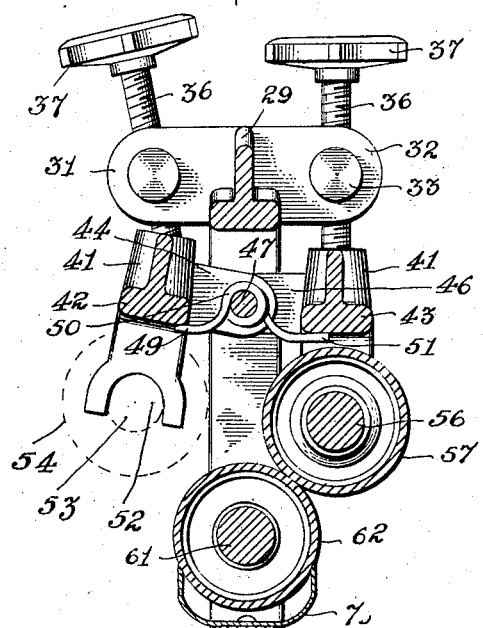
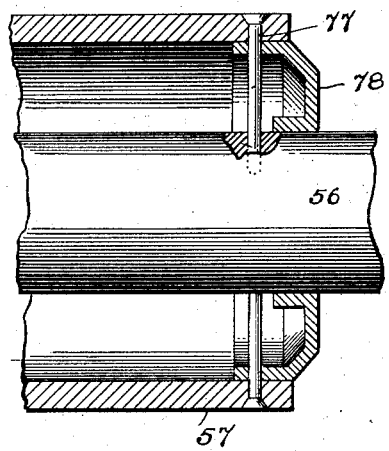
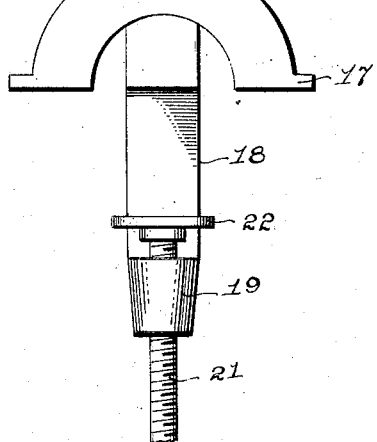
WITNESSES
INVENTORS
Raffaele Baccellieri
Angusto De Rentiis
BY
Joshua R. H. Potts
ATTORNEY Patented Sept. 9, 1930

1,775,505

UNITED STATES PATENT OFFICE

RAFFAELE BACCELLIERI, OF PHILADELPHIA, AND AUGUSTO DE RENTIIS, OF COLLINGDALE, PENNSYLVANIA

NOODLE-CUTTING MACHINE

Application filed February 15, 1930. Serial No. 428,603.

This invention relates to a noodle cutting machine.

The object of the invention is to provide an improved noodle cutting machine in which the rolls, knives, etc., may be quickly dismounted for cleaning, without the removal of any bolts, screws, etc.

Another object of the invention is to provide means which will operate to force the cut noodles down into the bottoms of the respective spaces between the knives so that they will be positively separated one from the other prior to stripping of the same from the knife roll.

A still further object of the invention is to provide a machine whereby the thickness of the noodles may be quickly and conveniently regulated without the removal, or minute adjustment, of any of the parts.

A further object of the invention is to provide a noodle cutting machine which may be quickly and conveniently mounted for operation upon a table or other support and which, when so mounted, will be capable of producing any number of noodles desired without re-adjustment.

According to the invention the noodle cutting machine is provided with a frame comprising a clamping member and a yoke having bearings to provide rotation for a bottom roll, a pair of brackets pivotally supported by said yoke and provided with semi-bearings which, operating in conjunction with the lower roll, are arranged to retain said rolls in proper position when said brackets are at or near their lower position, one of said rolls being a smooth-faced roll adapted to cooperate with the bottom roll for rolling out the noodled dough into a sheet of the required thickness, and the other roll being provided with a plurality of cutting knives for cutting the rolled dough into noodles, intermeshing gears on said rolls so arranged that the speed of the roll having the cutting knives travels at a slightly greater speed than the reducing roll in order that the cut noodles may be pulled down between the knives and separated one from the other, means for holding the brackets in position whereby the semi-bearings hold the gears in meshed relation, and means for urging the said brackets upward when said last named means is released.

If desired, the machine may be provided with means for stripping the cut noodles from between the cutting knives on the cutting roll.

The drawings illustrate an embodiment of the invention and the views therein are as follows:

Figure 1 is a rear view of the noodle cutting machine and shows a part of the knife roll broken away, Figure 2 is a vertical sectional view on the line 2—2 of Figure 1, Figure 3 is a side view looking in the direction of the arrow A in Figure 1, Figure 4 is a top plan view showing the operating handle broken away, Figure 5 is a horizontal sectional view taken on the line 5—5 of Figure 1, Figure 6 is a vertical sectional view taken on the line 6—6 of Figure 1, Figure 7 is a fragmentary vertical sectional view showing the manner in which the upper reducing roll is secured to its shaft, Figure 8 is a similar view showing the manner in which the lower reducing roll is secured to its shaft, Figure 9 is a vertical sectional view of the complete lower roll and it may be indicated as being taken on the line 9—9 of Figure 8, Figure 10 is a vertical sectional view through the yoke at the point where the adjusting screw for adjusting the position of the same enters the cup formed therein, and Figure 11 is a diagrammatical view of the rolls and illustrates the manner in which the dough is reduced and drawn into the cutting roll.

The frame, generally designated as 16, is provided with a foot 17 and with an overhanging part 18 having a lug 19 through which a screw 21 extends for elevating the plate 22 which, in conjunction with the foot 17, fastens the frame to any convenient support.

The screw 21 may be rotated so as to elevate the plate 22 by means of a pin or bar to turn the nut 23.

The upper part of the frame comprises a yoke having side members 24 and 26, a lower member 27, and an upper member 28. These several members may be provided with ribs 29, as may also the overhanging portion 18, for giving the frame the proper and necessary strength.

The upper member 28 is in the form of a flattened inverted V and extending out from each side of the same are bifurcated wing members 31 and 32. Extending between the two wing members 31 and between the two members 32 are swivel pins 33 which are each provided with threaded holes 34 for the reception of screw members 36.

These screws are each provided at their upper ends with an operating wheel 37 while the lower ends of said screws are tapered, as shown at 38 in Figure 10, and fit within the recesses 39 in the lugs 41 formed in the swinging brackets 42 and 43.

These swinging brackets are provided with wings 44 and 46, respectively, on each end of the same, and said wings are pivotally mounted on a rod 47 which extends through the side members of the yoke and is provided with a nut 48 on each end of the same to prevent longitudinal movement.

The wings are spaced on the brackets so that when the said brackets are mounted in the yoke there will be just sufficient room to include the wings between the side members of said yoke and to allow no lateral movement.

The rod 47 has a spiral spring 50 mounted thereon and one of the ends 49 of said spring engages the lower face of the bracket 42, while the other end 51 engages the underface of the bracket 43.

This spring is so arranged that the tendency is to urge both the brackets into the position shown by the bracket 42 in Figure 6 and the tension of the spring is overcome in both brackets by screwing the respective screws 36 down into the recess 39 by operating the hand wheel 37.

The outer ends of the brackets 42 and 43 are turned downwardly and each end of both brackets terminates in a bifurcated portion which provides a semi-bearing 52, the bracket 42 being adapted to receive the shaft 53 of the cutting roll 54, while the bracket 43 is adapted to receive the shaft 56 of the reducing roll 57.

The side members 24 and 26 of the yoke are provided with bearings 58 and 59 for receiving the shaft 61 of the lower reducing roll 62.

This roll has its shaft extended on the same side of the machine as the overhanging member 18 and is provided with a handle 63 (broken away) for operating the lower roll.

The shafts 53, 56 and 61 are each extended at the other side of the frame and the shaft 61 of the lower roll is provided with two gears 64 and 66 adapted to mesh, respectively, with the gear 67 on the cutting roll 54 and with the gear 68 on the reducing roll 57.

The operation of the shaft 61 by the turning of the handle 63 operates both the gears 64 and 66 on account of the gear 64 which is the larger of the two gears meshing with the gears 67 which is smaller than the gear 68, and the cutting roll 54 will be driven at slightly greater speed than the rolls 57 and 62.

By referring to Figure 11 the dough 69 is reduced at 71 between the rolls 57 and 62 and is passed onto the cutting roll 54 where it engages the knives 72. If, for instance, the speed of the roll 54 at the outer periphery of the knives 72 was the same as the peripheral speed of the rolls 57 and 62, the dough would lie at the outer edges of the knives and would not make a clean cut and would have to be stripped from between said knives.

But, by reason of the increased peripheral speed of the roll 54, the cut strips of noodles will be drawn down into the space between the knives 72, as shown at 73, and by reason of such increased speed, the cut noodles will be slightly stretched so that the edges thereof will not adhere to the sides of the knives and, therefore, the cut noodles will readily fall from between the knives, as shown at 74.

The lower roll 62 is provided with a scraping member 76 which thoroughly scrapes the said roll and prevents any dough or flour from remaining thereon.

The upper reducing roll 57 may, if desired, be provided with scraping means for removing excess dough or flour therefrom, but as this roll is readily removable by the operation of the handle wheel 37, it may be disconnected with ease and thoroughly washed, as may also the cutting roll.

The roll 57 and the cutting roll 54 are retained in operative position by means of the semi-bearings 52 in the brackets 42 and 43, pressing the said rolls into contact with the lower reducing roll 62 and when the screws 36 are elevated a sufficient distance by the rotation of the hand wheels 37, the spring 50 will raise the released bracket 43 and permit the roll to drop therefrom.

Of course, it will be understood that dough of different thicknesses may be provided by the rolls 57 and 62 by merely releasing the screw 36 a small amount as desired and the bracket 43 will thus be thrown slightly upward by the action of the end 51 of the spring 50 and while the roll 57 will normally retain its contact with the lower roll 62 upon the entrance of dough between the same, the upper roll 57 will be raised so as to properly seat the shaft 56 in the recess 52 which constitutes the semi-bearing for the same.

In this way noodles of any desired thickness may be readily manufactured by merely adjusting the hand wheel 37.

The roll 57 is shown as being secured on the shaft 56 by screws 77 passing through the face of the roll and through end plates 78 which bear upon the roll and properly space the same from the said shaft.

These rolls may be made of smooth steel tubing or they may be nickle plated, as desired.

The roll 62 on the shaft 61 is provided with an end plate 79, the inner end of which encircles the said shaft while the outer end edge of the same is provided with a circumferential shoulder 81, as shown in Figure 8.

This end plate 79 is held in position by means of a locking collar 82 which is made in half sections and the inner edge of which is tapered outwardly, as at 83, said edge fitting against a like-shaped shoulder in a peripheral groove 84 cut in the said shaft. (See Figure 9.)

Of course, while we have shown and described these particular means of assembling the rolls 57 and 62, it will be understood that various other means may be provided for effecting the same purpose.

It will be apparent that with the cutting roll 54 traveling at a slightly greater speed than the rolls 57 and 62 that the rolled sheet of dough emerging from the inner side of the last mentioned rolls will be pulled or stretched by the roll 54 and as the sheet is cutting the strips, the individual strips will be somewhat narrowed in width by means of this stretching, so that after being thoroughly cut and separated one from the other, the cut strips or noodles will readily fall from between the circular knife blades 72 into any receptacle provided for the same.

Of course, it will be apparent that by merely operating the hand wheels 37 to permit the brackets 42 and 43 to be sprung upward by the spring 50 the reducing roll 57 and cutting roll 54 may be quickly and conveniently removed from the machine and cleaned and replaced in a moment.

The roll 62 may also be cleaned as desired, but on account of the very effectual scraper 76 which engages the same, it is seldom necessary to clear this roll.

Of course, the noodle cutting machine illustrated may be modified and changed in various ways without departing from the invention herein set forth and hereafter claimed.

The invention is hereby claimed as follows:

1. A noodle cutting machine comprising a frame, a reducing roll mounted therein, brackets swingably mounted on the same pivot carried by said frame and providing in combination with said roll means for revolubly mounting another reducing roll and a cutting roll in operative position, means for holding said brackets in said last named position, and means for raising said brackets to permit the removal of said last named reducing roll and said cutting roll when said first named means is released.

2. A noodle cutting machine comprising a frame, a reducing roll mounted therein, brackets swingably mounted on said frame and providing in combination with said roll means for revolubly mounting another reducing roll and a cutting roll in operative position, arms extending on opposite sides of a frame part, manually operable screws carried at opposite ends of said arms for adjustably holding said brackets in said last named position, and means for raising said brackets to permit the removal of said last named reducing roll and said cutting roll when said screws are released.

3. A noodle cutting machine having reducing rolls and a noodle cutting roll, means for rotating one of said reducing rolls, and mechanism operable through said rotated roll for driving the other reducing roll at the same surface speed and for driving the cutting roll at a greater rate of surface speed than said rotated roll.

4. A noodle cutting machine having reducing rolls and a noodle cutting roll, means for rotating one of said reducing rolls, and gear trains operable through said rotated roll for driving the other reducing roll at the same speed and for driving the cutting roll at a greater rate of surface speed than said rotated roll.

5. A noodle cutting machine having reducing rolls and a noodle cutting roll having a plurality of knives, and gear mechanism for rotating said cutting roll at a slightly greater surface speed than said reducing rolls whereby the cut noodles are slightly stretched, thereby reducing the width of the same and permitting the cut noodles to freely fall from between the knives on said cutting roll.

6. A noodle cutting machine comprising a frame, a reducing roll mounted therein, brackets swingably mounted on said frame and providing in combination with said roll means for revolubly mounting another reducing roll and a cutting roll in operative position, means for holding said brackets in said last named position, means for driving the cutting roll at a faster rate of surface speed than said reducing rolls, and means for raising said brackets to permit the removal of said last named reducing roll and cutting roll when said first named means is released.

7. A noodle cutting machine comprising a frame, a reducing roll mounted therein, brackets swingably mounted on said frame and providing in combination with said roll means for revolubly mounting another reducing roll and a cutting roll in operative position, means for holding said brackets in said last named position, gears between said rolls for driving the cutting roll at a faster rate of surface speed than said reducing rolls, and means for raising said brackets to permit the removal of said last named reducing roll and cutting roll when said first named means is released.

8. A noodle cutting machine comprising a frame, a reducing roll having a shaft mounted in said frame, brackets swingably mounted on said frame and providing in combination with said roll means for revolubly mounting the shafts of a reducing roll and a cutting roll in operative position, means for holding said brackets in said last named position, an operating handle on one end of the shaft of said first reducing roll, gears on the other end of the shaft of said reducing roll, gears on the shafts of the last named reducing roll and the cutting roll and adapted to be operated by the gears on the first named reducing roll, said gears being so related that the reducing rolls travel at the same rate of surface speed while the cutting roll travels at a slightly greater rate of surface speed.

In testimony whereof we have signed our names to this specification.

RAFFAELE BACCELLIERI.
AUGUSTO DE RENTIIS.